United States Patent [19]

Goldsworthy et al.

[11] 3,801,407
[45] Apr. 2, 1974

[54] APPARATUS AND METHOD FOR PRODUCING PLASTIC REINFORCED SHEET LAMINATES

[75] Inventors: William B. Goldsworthy, Palos Verdes Estates; Ethridge E. Hardesty, Pine Valley, both of Calif.

[73] Assignee: Goldsworthy Engineering, Inc., Los Angeles County, Calif.

[22] Filed: Apr. 14, 1972

[21] Appl. No.: 244,188

[52] U.S. Cl.................. 156/380, 156/181, 156/272, 156/436, 156/497, 156/527
[51] Int. Cl............................................. B29c 25/00
[58] Field of Search .......... 156/380, 436, 497, 499, 156/523, 556, 176, 272, 181

[56] References Cited
UNITED STATES PATENTS

| | | | |
|---|---|---|---|
| 3,037,897 | 6/1962 | Pelley | 156/272 X |
| 3,471,352 | 10/1969 | Brooke et al. | 156/272 |
| 3,586,574 | 6/1971 | Soda et al. | 156/499 X |
| 3,669,804 | 6/1972 | Clausen et al. | 156/176 X |

*Primary Examiner*—Edward G. Whitby
*Attorney, Agent, or Firm*—Robert J. Schoop

[57] ABSTRACT

An apparatus and method for producing reinforced plastic sheet laminates where a plurality of fiber containing webs or sheets are passed into a curable resin matrix, facewise disposed on each other in marginal registration, and then cured by means of a pair of radio frequency curing units disposed on opposite sides of the marginally registered sheets. The laminate is pulled through the apparatus by means of a plurality of clamps which reciprocatively shift in timed relationship to the movement of the cured laminate. The apparatus and method is also useful for laminating reinforced fiber containing webs to opposed flat surfaces of a structural member. The fiber containing webs are introduced into a curable resin matrix and are preheated by means of radio frequency during units prior to contact with the surface of the structural member. Shortly thereafter, the webs are fixed in facewise contact with the structural member where the heating proceeds to an ultimate cure, thereby bonding the fibrous sheets to the structural member. A pair of rotating belts are used to move the laminated structure through the curing area and a plurality of clamps which reciprocatively move in timed relation to the laminate are used to move the laminate through the apparatus.

21 Claims, 12 Drawing Figures

APPARATUS AND METHOD FOR PRODUCING PLASTIC REINFORCED SHEET LAMINATES

BACKGROUND OF THE INVENTION

The present invention relates in general to certain new and useful improvements in systems for producing laminated structures and, more particularly, to systems for producing laminated structures having reinforced plastic components included therein.

In recent years, reinforced plastics have achieved increasing prominence and have found applications in many areas which were previously satisfied by products fabricated of heavy metal and other structural materials. Furthermore, improved raw material prices and increased availability of reinforced plastic materials has favored the use of reinforced plastic materials in the production of plastic sheet laminates and structural members. It is well known in the reinforced plastic art that flat fiberglass reinforced plastic panels can be produced by a molding procedure in which a plurality of the resin impregnated fiberglass sheets are laminated in juxtaposition, and then cured in a large oven or curing device. Furthermore, the prior art has taught of the incorporation of aluminum separators or other types of separators between the various plastic sheets.

However, in order to prevent the boiling of the resin matrix around the edges of the sheets to be laminated, the heat in the curing operation had to be applied very slowly which inherently created a rather long curing operation. Furthermore, in prior art attempts to laminate the resin impregnated fiberglass sheets to structural panels such as wooden panels, the condition of "steaming" occurred. This condition resulted from a boiling of the moisture contained in the wood or similar member upon application of heat to the laminated structure. The generated steam materially interfered with the actual curing of the flat sheet material and the resultant inherent strength and aesthetic appearance of the structural panel.

In view of the long curing time and high rejection rate of the various prior art methods for producing generally flat fiberglass reinforced plastic panels it has long been desirable in the art to provide a method and apparatus for the continuous production of plastic sheet laminates containing fiberglass reinforced plastic members. Heretofore, such a continuous process and apparatus has been impractical by virtue of the manufacturing problems which have arisen and the high rejection rate of the finally produced product.

It is, therefore, the primary object of the present invention to provide a method and apparatus for producing flat fiberglass or other fiber containing reinforced plastic panels in a continuous operation.

It is another object of the present invention to provide a method and apparatus for laminating reinforced fiber-containing webs to opposed flat surfaces of a structural member on a continuous basis.

It is an additional object of the present invention to provide an apparatus and method of the type stated in which plastic panels and structural members are laminated with fiberglass or other fiber containing webs in a relatively quick-cure operation.

It is also an object of the present invention to provide an apparatus and method of the type stated where the resin matrix impregnated in the fiberglass or other fiber containing material can be effectively cured without generating localized overcured or insufficiently cured areas.

It is another salient object of the present invention to provide an apparatus and method of the type stated which can be operated in a highly efficient manner and which can be operated on a mass-production basis to produce relatively low cost end products.

With the above and other objects in view, our invention resides in the novel features of form, construction, arrangement and combination of parts presently described and pointed out in the claims.

SUMMARY OF THE INVENTION

Generally speaking, the present invention resides in an apparatus which is capable of producing flat sheet plastic reinforced laminates by laminating marginally registered fiber reinforced resin impregnated sheets. Furthermore, the present invention is capable of producing a rigid panel by laminating fiber-reinforced resin-impregnated sheets to a rigid panel.

In one embodiment of the apparatus, fiber reinforced sheets such as fiberglass mat, is drawn through a resin impregnating tank where the glass mat is impregnated with a suitable curable resin. The excess resin is removed from the glass mat by means of a doctor blade or similar mechanism. Thereafter, the impregnated sheets are passed through a suitable radio frequency preheating mechanism of a type to be hereinafter described in more detail. In this preheating mechanism, the energy is established at a level to raise the resin matrix to a point slightly below the curing level, but not at a level to cure the matrix per-se. Thereafter, the fiberglass mats are brought into facewise contact with a fairly rigid board such as plywood and facewise disposed upon this board member.

After the resin impregnated fiberglass mats are facewise disposed on the board, they are brought into contact with continuously moving belts which are reinforced by skid plates. Furthermore, forced hot air is blown through the belts and skid plates to the resin impregnated mats for ultimately curing the mats and bonding the same to the rigid board. By preheating the resin impregnated mats, the possibility of entrained air resulting in air bubbles when the fiberglass mat is secured to the board, is substantially reduced.

The laminated structure is pulled through the apparatus by means of two traveling clamps which are located in downstream arrangement with respect to the curing mechanism. These two traveling clamps alternately advance, grasp and pull with an action over-lapping in time the laminated structure, in the manner of pulling a rope with two hands, not hand-over hand, but with one hand constantly behind the other, at least one clamp or hand pulling at all times. Thus, the laminated structure which is produced and cured, is pulled from the curing mechanism and through the successive stages of the apparatus at a constant speed, but with never relaxing tension.

The laminate structure is then moved through an edge-trim saw which removes the longitudinal margins of the laminated structure as it is produced. Finally, a flying cut-off saw cuts the laminated structure into discrete segments in a plane transverse to the movement of the laminated structure. The flying cut-off saw is mounted on a longitudinally shiftable member so that it is shiftable in pretimed relationship to the movement of the laminated structure as it is produced. During the longitudinal shifting movement, the cut-off saw shifts transversely to cut the structure into discrete sections.

The present invention also provides a modified form of apparatus which is similar to the previously discribed apparatus, but does not laminate the fiber mat to a rigid board. In this case, a plurality of fiber reinforced mats are resin impregnated and facewise disposed upon each other in marginal registration and laminated in such condition.

The essence of the present invention can be described as an apparatus and method for producing reinforced plastic sheet laminates where a plurality of fiber containing webs or sheets are passed into a curable resin matrix, facewise disposed on each other in marginal registration, and then cured by means of a pair of radio frequency curing units disposed on opposite sides of the marginally registered sheets. The laminate structure is pulled through the apparatus by means of a plurality of clamps which reciprocatively shift in timed relationship to the movement of the cured sheets. The apparatus and method is also useful for laminating reinforced fiber containing webs to opposed flat surfaces of a structural member. The fiber containing webs are introduced into a curable resin matrix and are preheated by means of radio frequency curing units prior to contact with the surface of the structural member. Shortly thereafter, the webs are fixed in facewise contact with the structural member where the heating proceeds to an ultimate cure, thereby bonding the fibrous sheets to the structural member. A pair of rotating belts are used to move the laminated structure through the curing area, and a plurality of clamps which reciprocatively move in timed relation to the laminate are used to move the laminate through the apparatus.

DETAILED DESCRIPTION

Figure 1:
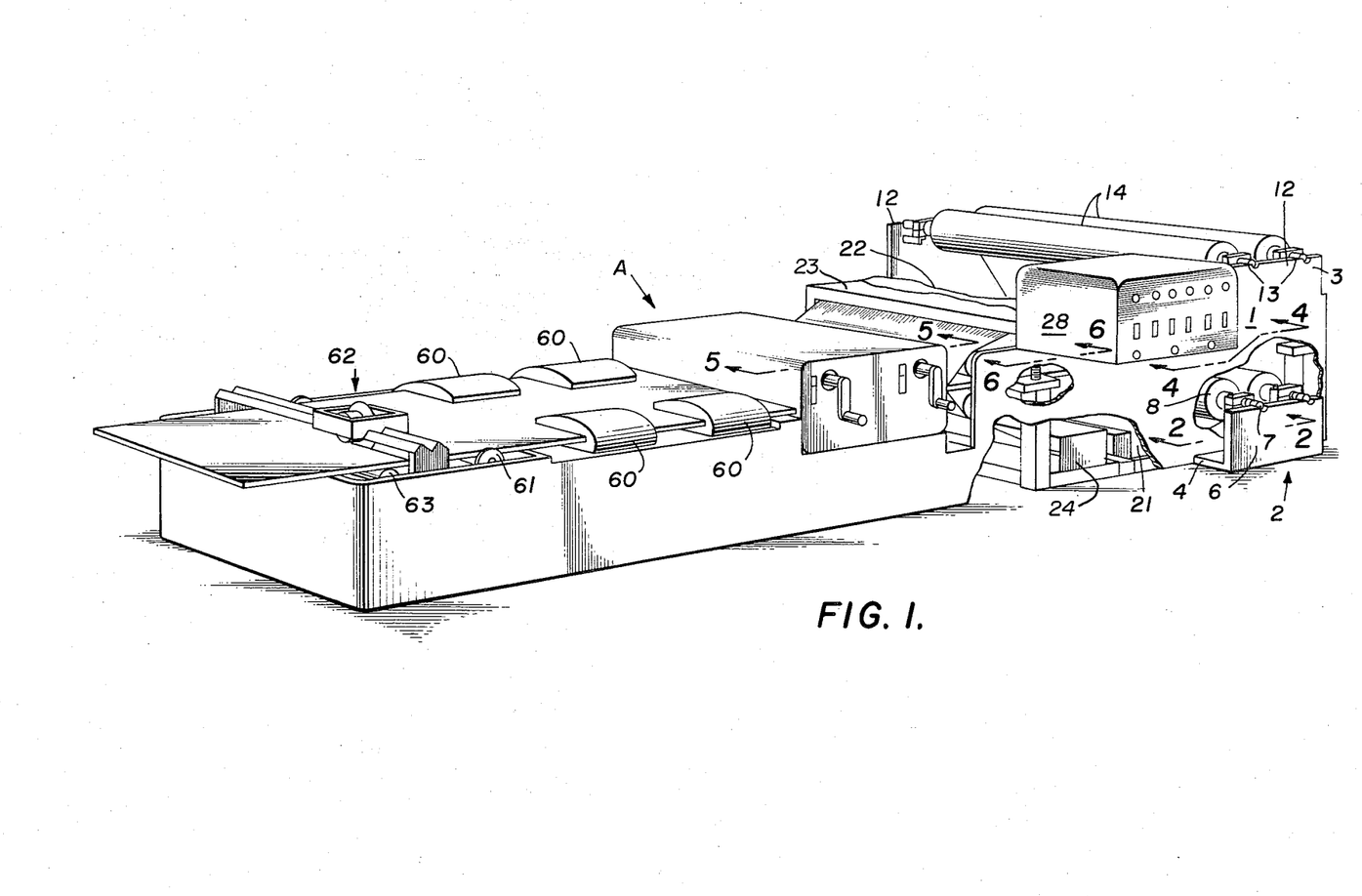
FIG. 1 is a perspective view of an apparatus constructed in accordance with and embodying the present invention.
Figure 2:
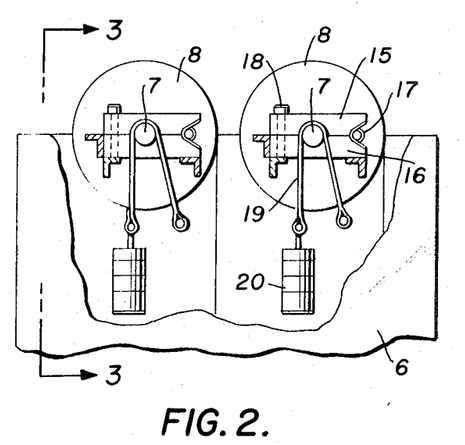
FIG. 2 is a fragmentary horizontal sectional view taken along line 2—2 of FIG. 1.
Figure 3:
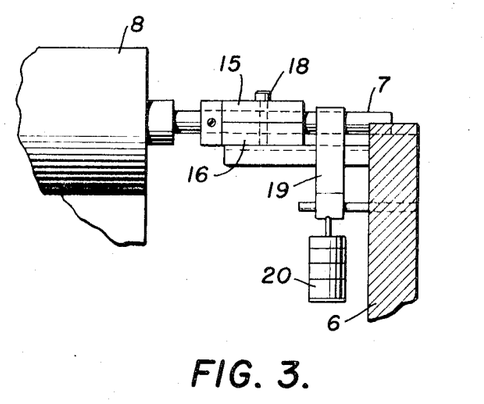
FIG. 3 is a fragmentary vertical sectional view taken along line 3—3 of FIG. 2.

Referring now in more detail and by reference characters to the drawings that illustrate practical embodiments of the present invention, A designates an apparatus for producing a reinforced plastic sheet laminate, and which apparatus is more fully illustrated in FIG. 1. The apparatus A generally comprises a rectangularly shaped box-like housing 1 including a lower mat supporting frame 2 and an upper mat supporting frame 3. As shown in FIGS. 2 and 3, the lower mat supporting frame 2 includes a base plate 4, a right end wall, and a pair of longitudinally extending front and rear side plates 6. Rotatably supported on and transversally extending from each of the side plates 6 are a pair of pintles 7 for supporting rolls of fiberglass or other fiber containing reinforced mat 8. The pintles 7 may be spring loaded or otherwise maintained under tension in order to impart to the fiberglass mat 8 a tension as it is removed from the spools or rolls of mat 8. Furthermore, the pintles 7 are secured to the side plates 6 in such a manner that they can be removed for convenient installation of new rolls of glass or other fiber containing mat 8.

The upper web supporting frame 3 also includes a pair of longitudinally extending side plates 12 in the manner as illustrated in FIG. 1. Rotatably supported by the side plates 12 are a pair of longitudinally spaced transversally extending spool shafts or pintles 13 which support spools of fiberglass mat 14. The mats 14 may be formed of the same material as the mats 8 or they may be formed of different fiber reinforced material, depending on the overall qualities desired in the final laminate. In like manner, the pintles 13 may be spring-loaded and removable in the same manner as the pintles 7.

Any type of fiber reinforced mat material may be employed in the present invention, though the most preferred mat material employed is that made of glass, e.g. fiberglass mat. In this respect, it should be understood that while the embodiments of the present invention are described utilizing fiberglass mat or fabric, that the use of fiberglass is only examplary and other fiber containing material (hereinafter described) can be used. Therefore, it should be recognized that fiber reinforced mat material formed of carbon, quartz, graphite, asbestos, aluminum, etc., can be effectively used. Mats formed of lithium and grown whisker materials can also be employed. In addition, it is possible to employ fiber reinforced mats with metal wire interspersed betweeen the fiber material in the mat, in the event that it is desired to add some type of metallic body to the mat material and to the ultimate laminate, for purposes such as achieving electrical conductivity. The term "mat" which refers to the fiber containing fabric is often used interchangably herein with the term "web" and each refer to a fabric which contains fiber reinforcing material.

FIGS. 2 and 3 disclose the mechanism for mounting the pintles 7 on the side plates 6. Inasmuch as the mechanism for retaining the pintle 13 is identical to the mechanism for retaining the pintle 7 on the side plate 6, only the latter mechanism will be described in detail. It can be seen that the pintles 7 are held by means of upper and lower retaining blocks 15, 16 which are pivotal with respect to each other on a pin 17. The two blocks 15, 16 are held in engagement by means of a removable clamp 18, the latter being conventional in its construction. Finally, a retaining ring 19 is secured to each of the outer ends of pintles 7 and connecting to the lower end thereof are removable weights 20. Thus, the weights 20 can be adjusted in order to maintain the proper hold-down tension on shaft 7 and, hence, the mats 8.

By further reference to FIG. 1, it can be seen that the mats 8, 14 are introduced into resin impregnating tanks 21, 22 respectively. The mats are placed beneath the surface of the reinforced resin matrix maintained in the tanks 21, 22 by means of hold-down rollers (not shown). Thereafter, the resin impregnated mats 8 and 14 are moved outwardly from the tanks 21, 22 and into the squeeze housing 23, 24 where excess resin in removed from the mats. A doctor blade (not shown) may be located in these squeeze housing for removal of the excess resin. The resin tanks 21, 22 and the squeeze housing (not shown) are all conventional in their construction, and therefore, the details of the construction are not described in any further detail herein.

Any material which is capable at some stage of the process of being liquefied and softened for a period of time may be employed as the resin binder or so-called "matrix". The matrix should be sufficient to flow into the filament and fill the interstices between adjacent filaments and layers thereof before achieving a rigid state through cooling or completing polymerization to become a rigid solid. Furthermore, the matrix should possess the ability to adhere to the reinforcement. Some examples of the suitable binders or matrix which can be employed in the present invention are various thermoplastic resins, such as nylon, polyethylene, polypropylene, many of the polycarbonates, polyesters, etc. In addition, thermosetting resins such as polyesters, many of the pheonlics and epoxy etc. can be used. Generally, the thermosetting resins should be capable of being fused into an insoluble, nonheat softening mass upon application of heat or similar method of triggering the catalytic system. Other binders or matrices are hard waxes, eutectic ceramics, eutectic metals, synthetic rubbers, etc.

In order to obtain adequate impregnation of the woven fiber mat or fabric, it is necessary to forceably "pump" liquid resin into the web, thereby forcing thus-displaced air outwardly from the web. This system is best accomplished by passing the wet-web between kneading rolls which alternately squeeze and relax the laminate, much in the same manner as squeezing an immersed sponge several times to displace its air with a liquid.

Figure 6:
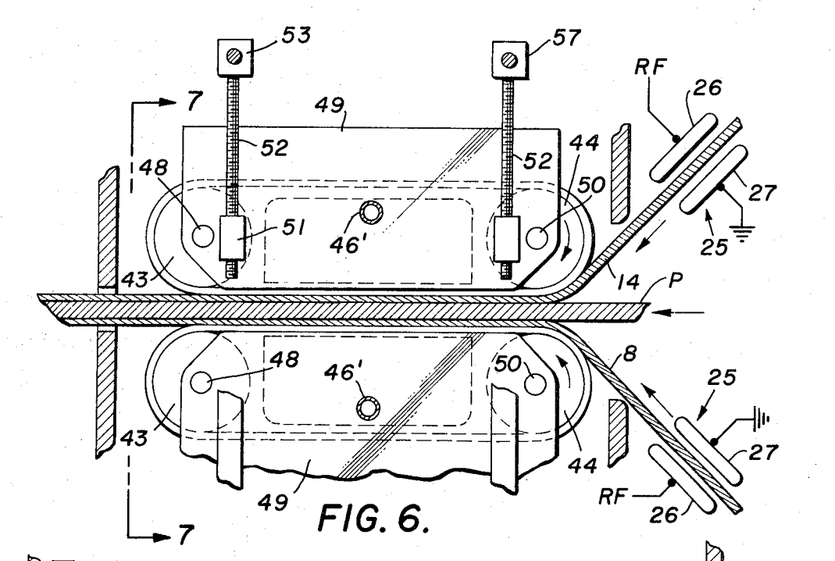
FIG. 6 is a fragmentary horizontal sectional view taken along line 6—6 of FIG. 1 and showing portions of the feeding mechanism disclosed in FIG. 5.

Thereafter, the fiber mat is passed into dielectric resin preheaters or so-called "precurers" 25 in the manner as illustrated in FIG. 6. The dielectric preheaters 25 generally comprise a pair of spaced apart electrodes 26, 27 which are connected to a suitable R.F. generator (not shown). The electrodes 26, 27 are essentially flat metal plates with a gap therebetween to accomodate the fiber-mat. The energy requirements for the dielectric precuring unit 25 have been calculated as being approximately 60 kilowatts at 27 megahertz. This type of energy level will deliver sufficient voltage to accomodate a two inch air gap as well as feed the impregnated facings. Furthermore, the R.F. generator would be air-cooled internally and provided with fans or blowers to pull the air into the generator cabinet through standard dust filters. Finally, the R.F. generator, as well as the various other mechanisms on the apparatus A, would be operated from a master control panel 28, through which all control commands and settings originate. The actual control system which is used to operate the various components in the apparatus A in pre-timed arrangement would be essentially conventional in its construction and is also dependent upon the various operating parameters desired in the apparatus. Accordingly, the control system as such, is neither defined nor illustrated in any detail herein.

The R.F. curing units of the present invention may also operate at a frequency range of 13 to 100 megahertz. Furthermore, microwave curing units may also be employed and would operate within the range of 1,500 to 25,000 megahertz. Accordingly, the term "dielectric" as used herein, will refer to both R.F. curing in the range 13 to 100 megahertz and microwave curing from 1,500 to 25,000 megahertz. While the theory of microwave and radio frequency curing is not completely understood, it is believed that the curing in most resin-fiber systems, in part, occurs by molecular interaction, and particularly, molecular friction. The molecules of the resin have a polar structure, such that when an electrical field is introduced across the molecules of the resin, the molecules will tend to orient in the direction of the field. After release of the field the molecules will attempt to reorient back to their original direction. This is believed to create a frictional effect between the molecules and thereby produce heat in the resin matrix.

Figure 4:
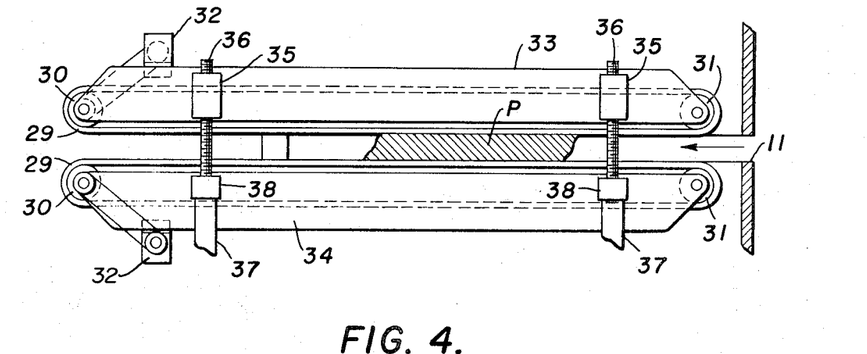
FIG. 4 is a fragmentary horizontal sectional view taken along line 4—4 of FIG. 1.

The ability of the resin matrix to accept the electrical energy is dependent upon the electrical host tangent of the resin system. Accordingly, the thermosetting resins are selected with the proper electrical loss tangent for use in the dielectric curing system of the present invention. All of the thermosetting resins described hereinabove have the proper electrical loss tangents for use in this system. The resins all have a high electrical loss tangent in the monomeric form and a low electrical loss tangent in the polymeric form. In this manner, the curing process is self-limiting so that the resin matrix may not be over-cured. In addition, the amount of energy directed to the plates 26, 27 is carefully controlled so that the resin is not actually cured. The resin may be advanced to a B or partially cured stage but is not advanced to the C or finally cured stage. A rigid panel member P is introduced into the apparatus A through the panel receiving slot 11. Two conveyor belts 29 trained around driven rollers 30 and idler rollers 31 engage the upper and lower faces of the panel P and urge the panel P longitudinally through the apparatus A, in the manner as illustrated in FIGS. 1 and 4. The panel P, as indicated previously, may be formed of plywood or other material which is preferably dielectric in nature. Furthermore, other forms of reinforced plastic composites may also be used for purposes of receiving the laminate facings. In addition, other types of internal cores could be employed. Planks of paper honeycomb cores with good surface planarity can be used as well. Generally, any internal core must not be made from metal, and should preferably be premolded such as from a glass-polyester composite in order to avoid undue dielectric heating as the laminate passes through the dielectric curing zone.

By further reference to FIG. 4, it can be seen that the driven rollers 30 are powered by means of suitable electric motors 32. Furthermore, the upper conveyor belt 29, as well as the upper rollers 30, 31, are supported on an upper conveyor frame 33 and in like manner, the lower conveyor belt 29, as well as the attendant lowers rollers 30, 31, are supported on a lower conveyor frame 34. The upper conveyor frame 33 is supported by means of hubs 35 threadedly retained on a jack screw 36. Each hub 35 internally includes a worm gear box (not shown). In like manner, the lower conveyor support frame 34 is secured to a pair of support beams 37 and is shiftable with respect thereto by means of theaded retention on a pair of worm gear boxes 38. Thus, it can be seen that the two conveyor belts 29 can be shifted with respect to each other in order to define a panel receiving slot 11 of the desired dimension. Thus, the panel receiving slot 11 can be adjusted to conform to any desired thickness of panel.

Figure 5:
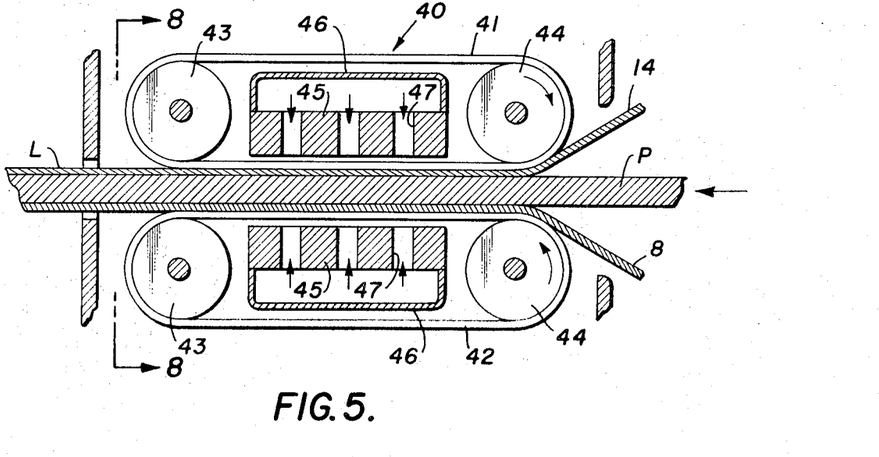
FIG. 5 is a fragmentary horizontal sectional view taken along line 5—5 of FIG. 1.

After precuring in the manner as previously described, the panel P and the fiber mats 8, 14 are brought into facewise contact, as illustrated in FIG. 5, to form a laminate or so-called "laminate structure" L, and are then passed into a curing mechanism 40, which is more fully illustrated in FIGS. 5–8. Immediately prior to the entry of the fiber mats 8, 14 into the curing mechanism 40 and after the same have moved through dielectric preheaters 25, the fiber mats 8, 14, including the resin matrix impregnated therein have been heated to a temperature exceeding the cure temperature of the resin matrix. However, the resin matrix remains wet and tacky because the resin has not had a sufficient amount of time to cure, and therefore, upon the resin curing while in curing mechanism 40, the mats 8, 14 become tenaciously adhered to panel P. The curing mechanism 40, generally comprises a pair of continuously rotating belts 41, 42 which rotate in the direction of movement of the laminate structure and are trained around drive roller 43 and idler rollers 44. The continuously moving belts 41, 42 will carry the impregnates from the initial wet-out, through the curing zone, and these belts 41, 42 are preferably made from glass-fabric-reinforced teflon. These belts 41, 42 may preferably be made of two or three ply with the butt-joint in each of the belt layers offset in order to eliminate double-thickness overlap joints. Furthermore, the belts would be driven through the action of the rollers 43, 44 primarily to facilitate startup. After the initial startup, the respective drives of these belts would normally be subservient to the gripper-pullers (hereinafter described) and only serve to assist in overcoming frictional forces.

Spaced between each of the rollers 43, 44 which carry each continuous belt 41, 42 are upper and lower skid plates 45 and which are connected to upper and lower hot air manifolds 46. The hot air manifolds 46 are connected through tubular ducts 46' to a suitable source of hot air (also not shown). Furthermore, each of the skid plates 45 are vertically drilled to provide air conducting apertures 47 for introducing the hot air to the continuous belts 41, 42 and hence to the laminate structure. Accordingly, the skid plates 45 serve two principal functions. The skid plates engage the belts 41, 42 and hold the same into tight contact with the surface of the laminate L passing between the two belts 41, 42. In this manner, there is no possibility of warpage when the mats 8, 14 are facewise adhered to the panel P.

As the laminate members pass between the two belts 41, 42, the hot air introduced into the skid plates 45 is passed through the apertures 47, and into contact with the lamate member to finally cure the same and thereby form a cured laminate. It should be observed in this connection, that the rate of movement of the web 8, 14 and the panel P is controlled so that the time interval that the panel takes to pass between the preheater 25 and the curer 40 is not unduly long and, is sufficiently short so that the resin does not cure to the C stage prior to introduction into the curer 40. It should also be observed that the skid plates 45 could also be constructed in the form of R.F. electrode plates and connected to a suitable R.F. generator for finally curing the laminated structure by means of a dielectric curing.

Figure 7:
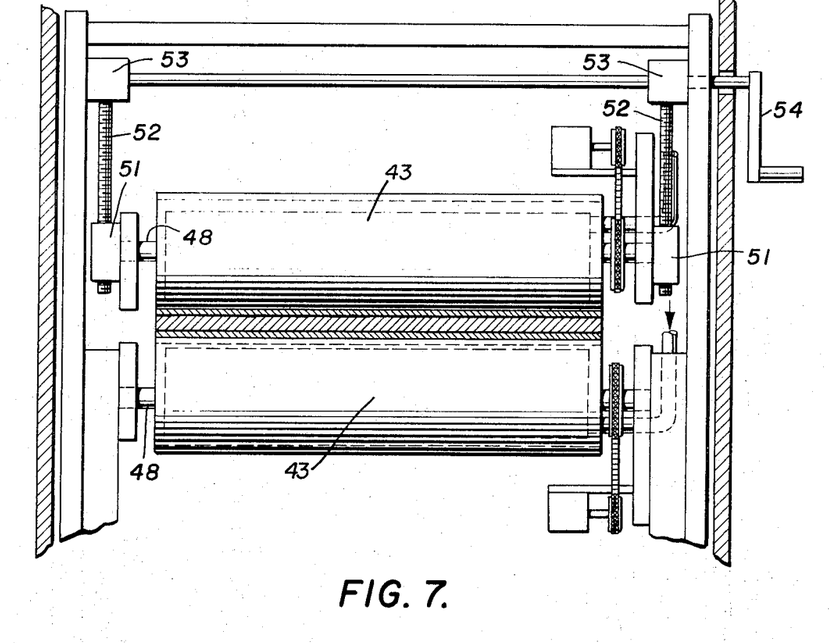
FIG. 7 is a fragmentary vertical sectional view taken along line 7—7 of FIG. 6.
Figure 8:
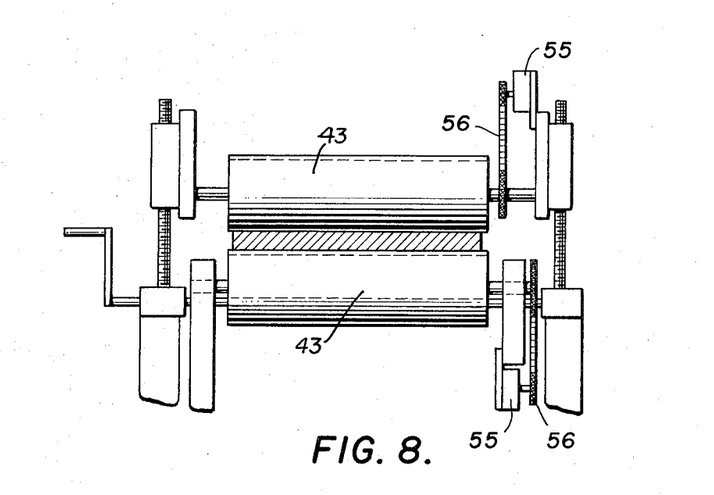
FIG. 8 is a fragmentary vertical sectional view, similar to FIG. 7 and showing portions of the drive means forming part of the feeding mechanism of FIG. 5.

By reference to FIGS. 6–8, it can be seen that the drive rollers 43 are mounted on drive shafts 48 which are journaled in mounting plates 49. In like manner, the idler rollers 44 are journaled on idler shafts 50 which are also secured to the mounting plates 49. It can be seen that the mounting plates 49 are secured to worm gear boxes 51 which are shiftably disposed in a vertical direction on jack screws 52. The upper ends of the jack screws 52 are in turn connected to a conventional gear boxes 53, in the manner as illustrated in FIG. 6. Accordingly, it can be seen that the gap for accepting the laminate structure L is adjustable in order to accommodate various thicknesses of laminate passing through the curing mechanism 40. The gear boxes 51 are connected to cranks 54 (FIG. 7) which are capable of rotating the jack screws 52 in order to shift the mounting frames 49 in a vertical direction. Thus, it can be seen that as the upper mounting frames will 49 shift upwardly, and the lower mounting frame 49 will shift downwardly in a substantially equal amount.

By reference to FIG. 8, it can be seen that the drive shafts 48 are connected to conventional electric motors 55 through a belt and pulley arrangement 56.

The laminate L is pulled through the aforesaid components by means of two pairs of traveling clamps 60, (FIG. 1) which are longitudinally and reciprocatively shiftable along longitudinally extending guide bars (not shown). The traveling clamps 60 grasp the edges of the laminate L alternately, and advance and pull with an action over-lapping in time so that at least one of the clamps 60 engages the laminate L at all times. Thus, it can be seen that at least two longitudinal sets of clamps 60 must be employed. These clamps 60 engage the longitudinal edges of the laminate L in the manner of pulling a rope with two hands, so that one hand is constantly behind the other and at least with one clamp or one hand pulling at all times. Thus, the laminate L is pulled through the successive stages of the apparatus at a constant speed and with never-relaxing tension. Each clamp 60 is also fitted with pressurized, cast urethane pads which grip the surface of the laminate L and draw it along. Accordingly, the problem of slippage is reduced. The clamps 60 are more fully described in U.S. Pat. No. 2,871,911 to W. B. Goldsworthy et al, and therefore not described in any further detail herein.

The clamps 60 pull the laminate L into transversely spaced edge-trim saws 61. These saws run continuously and trim the continuous longitudinal edges of the laminate L as it moves by. The edge-trim saws 61 are adjustable and will usually be set to finish-to-size as well as remove the hardened resin drips and burrs. When properly utilized, these edge-trim saws 61 will produce panels which require no further finishing or dressing. They are also equipped with water flooding to reduce dust. The edge-trim saws are essentially conventional in their construction and neither described nor illustrated in any further detail herein. However, diamond-rimmed saws are found to be most effective with skip-tooth diamond chip spacing to resist burning and subsequent glazing.

Finally, the laminate structure L is passed into a moving cutoff saw 62. This saw 62 is also conventional in its construction and is therefore neither described nor illustrated in any further detail herein. However, the saw supporting carriage which retains the saw 62, as illustrated in FIG. 1, is powered to pace the advance rate of moving laminate L exactly. This carriage movement is initiated, for each length cut-off, by a target switch (not shown) located on a runout table (also not shown). The trippings of this switch by the laminate L actuates the switch in the carriage drive which advances the cutoff saw to accompany the moving laminate L as it is moved through the apparatus A by means of the clamps 60. The target switch (mentioned above) is located in order to cut the moving laminate L into discrete sections of predetermined size.

A power roll-off bar 63 is located forwardly of the cutoff saw 62 and engages the discrete sheets of laminate L for conveying the same to a conveyor or other mechanism for stacking the discrete sections. The roll-off bar 63 is designed to rotate at a rate of speed to impart to the discrete laminate section a higher rate of travel than laminate L which is being formed in the apparatus A.

The apparatus of the present invention is designed to operate at a high rate of speed in the production of a laminate structure. The dielectric pre-heaters 25 generally heat the fiber mat to the B stage and, hence, eliminates substantially all of the moisture which would normally be contained in the fiber mat. In addition, only a slight amount of heating is required when the mats are superimposed upon the planar surfaces of the panel P in order to cure the mats and cause the mats to adhere to the panel P.

Figure 9:
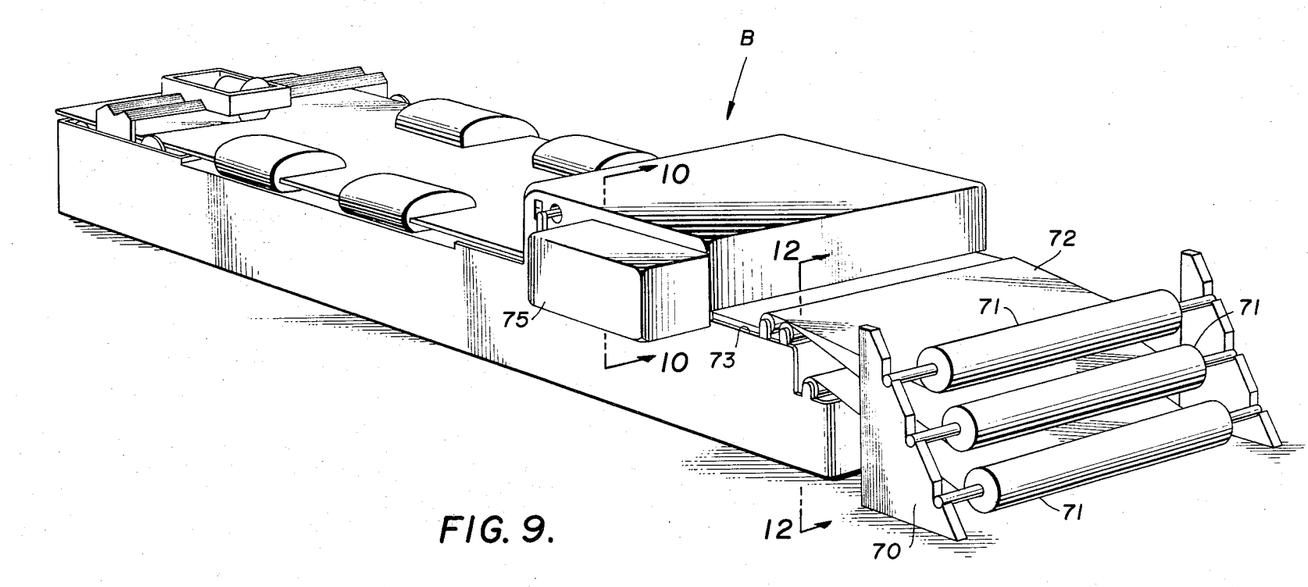
FIG. 9 is a prospective view of a modified form of apparatus constructed in accordance with and embodying the present invention.

It is possible to provide another modified form of apparatus B which is similar to the apparatus A and which is more fully illustrated in FIG. 9 hereof. The apparatus B is generally designed to produce a fiber mat laminate which does not employ a reinforcing member such as the panel P. The apparatus B generally comprises a creel platform 70 having a series of fiber spools 71 rotatably mounted thereon. The fiber spools are also mounted in such manner that a degree of tension is imparted to the fiber mat 72 as it is unwound from the spool 71. Furthermore, the mat 72 is introduced into a resin impregnating tank 73 which is substantially identical in construction to the resin impregnating tanks 21, 22. The resin impregnating tank 73 contains all of the suitable hold down rollers which are present in the resin tanks 21, 22. Finally, a doctor blade (not shown) may be located on the left-hand end of the tank 73. The mats 72 are then superimposed upon each other in marginal registration and introduced into a dielectric curing mechanism 75.

Figure 10:
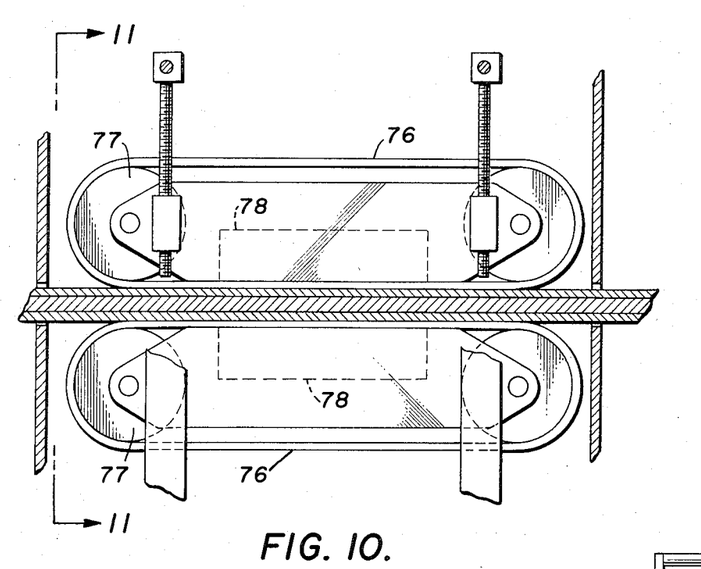
FIG. 10 is a fragmentary vertical sectional view taken along line 10—10 of FIG. 9 and showing a portion of the heating mechanism of FIG. 9.
Figure 11:
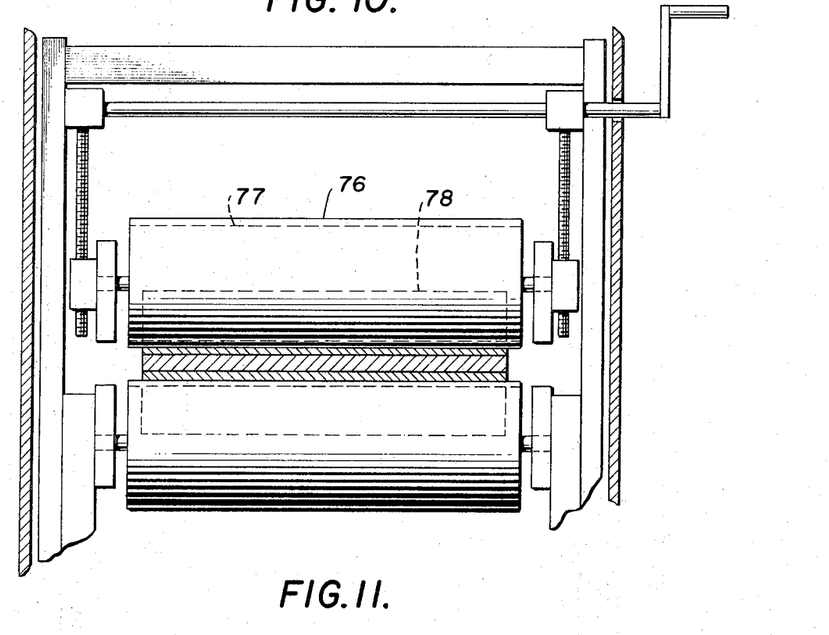
FIG. 11 is a fragmentary vertical sectional view taken along line 11—11 of FIG. 10.
Figure 12:
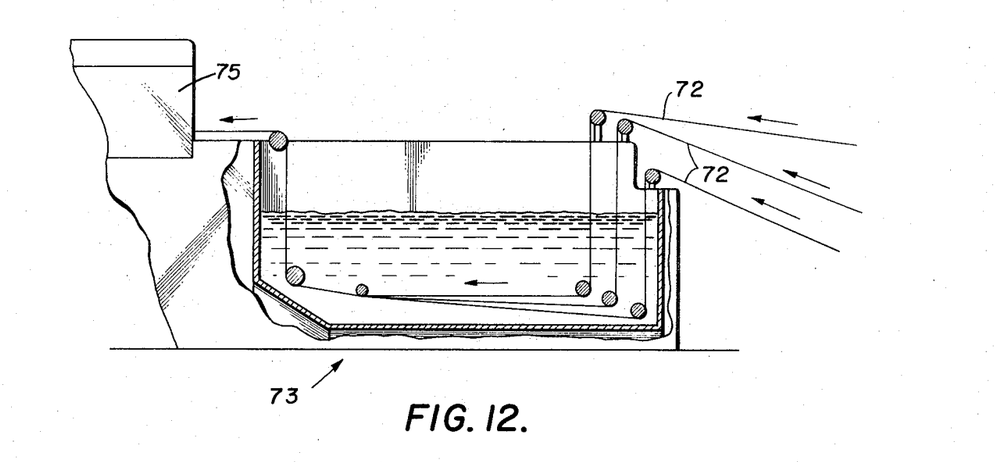
FIG. 12 is a fragmentary vertical sectional view taken along line 12—12 of FIG. 9 and showing the resin impregnating tank forming part of the apparatus of FIG. 9.

The dielectric curing mechanism 75 is illustrated in FIGS. 10 and 11 is somewhat similar to the previously described curing mechanism 40 and generally includes a pair of oppositely disposed cooperating continuously rotating belts 76 which are trained about and rotated through the action of drive rollers 77. A pair of skid plates 78, which also serve as electrodes of a dielectric curing system are connected to a suitable R.F. generator (not shown). In this manner, each of the fiber reinforced mats which have been superimposed in marginal registration can be cured into a rigid structure when the impregnated resin therein is advanced to the cured or C stage.

The skid plates 78 serve as a pair of electrodes which are, in turn, connected to a suitable R.F. energy generator or microwave energy generator (not shown). In this manner, each of the mats which contain the impregnated resin in the A stage, (or completely uncured stage) is immediately cured to the C stage in the curing mechanism. The remaining portion of the apparatus B is substantially identical to the apparatus A.

It should also be observed, that dielectric precurers similar to the precurers 25 could also be employed and a curing mechanism which is similar to the curing mechanism 40 could be used in conjuction with dielectric precurers.

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

1. An apparatus for producing a reinforced sheet laminated structure comprised of at least two laminatable members, and where at least one of said members is a filament containing reinforcing sheet; said apparatus comprising means for moving said laminatable members through said apparatus, means at a first station on said apparatus for impregnating at least the filament containing reinforcing sheet with a curable resin matrix, dielectic type precuring means at a second station on said apparatus for precuring the matrix in said filament containing reinforcing sheet with dielectric energy selected from the class consisting of radio frequency energy and microwave energy to a level immediately below the curing point of said matrix, electrode means operatively associated with said dielectric precuring means to establish a dielectric energy region across the laminatable members, means at a third station on said apparatus for bringing each of said members into marginally registered facewise contact, and means at a fourth station on said apparatus to finally cure said members in said marginally registered facewise contact into a rigid laminate structure, said last name means including a pair of continuous belt-like members which engage the exteriorly presented faces of at least two of said laminatable members and retain the same in said marginally registered facewise disposition during the final curing thereof.

2. The apparatus of claim 1 further characterized in that the means for moving the laminatable members through the apparatus comprises a pair of traveling alternately engageable and releasable clamp-like members.

3. The apparatus of claim 1 further characterized in that the apparatus comprises cutting members which are located with respect to the moving rigid laminate structure in order to remove the edges of the laminate structure in the direction of movement of the structure.

4. The apparatus of claim 1 further characterized in that the apparatus comprises a cutting member which is located with respect to the moving rigid laminate structure in order to cut the laminate structure transverse to the direction of movement thereof into a series of discrete laminate sections, said last named cutting member moving both longitudinally and transversally with respect to the laminate structure.

5. The apparatus of claim 1 further characterized in that the apparatus comprises first cutting members which are located with respect to the moving rigid laminate structure in order to remove the edges of the laminate structure in the direction of movement of the laminate structure, a second cutting member is located with respect to the moving laminate structure in order to cut the laminate structure transverse to the direction of movement thereof into a series of discrete laminate sections, said second cutting member moving both longitudinally and transversally with respect to the laminate structure.

6. The apparatus of claim 1 further characterized in that said precuring means comprises a dielectric precuring means including a pair of electrodes which are disposed on opposite sides of the laminatable members.

7. The apparatus of claim 1 further characterized in that first of said laminatable members is a filament containing reinforcing sheet which is initially flexible, and a second of said laminatable members is a rigid panel so that the filament containing reinforcing sheet is laminated to a flat surface of said rigid panel.

8. The apparatus of claim 1 further characterized in that first of said laminatable members is a filament containing reinforcing sheet which is initially flexible, and a second of said laminatable members is a rigid panel so that the filament containing reinforcing sheet is laminated to a flat surface of said rigid panel, and a third laminatable member in the form of a filament containing reinforcing sheet which is initially flexible is impregnated and laminated to the opposed flat surface of said rigid panel.

9. The apparatus of claim 1 further characterized in that said two named laminatable members are both filament containing reinforcing sheets which are initially flexible.

10. The apparatus of claim 1 further characterized in that said dielectric precuring means is operable with energy selected from the class consisting of radio frequency energy within the frequency range of 13 to 100 megahertz and microwave energy within the frequency range of 1,500 to 25,000 megahertz.

11. The apparatus of claim 1 further characterized in that the means to finally cure said members relies upon the use of hot fluid.

12. An apparatus for producing a reinforced sheet laminated structure comprised of at least two laminatable members, and where at least one of said members is a filament containing reinforcing sheet; said apparatus comprising means for moving said laminatable members through said apparatus, means at a first station on said apparatus for impregnating at least the filament containing reinforcing sheet with a curable resin matrix, dielectric type precuring means at a second station on said apparatus for precuring the matrix in said filament containing reinforcing sheet with dielectric energy to a level immediately below the curing point of said matrix, said precuring means including a pair of electrodes disposed on opposite sides of the laminatable members, means at a third station on said apparatus for bringing each of said members into facewise contact, and means at a fourth station on said apparatus to finally cure said members in said facewise contact into a rigid laminate structure.

13. An apparatus for producing a reinforced sheet laminated structure comprised of at least two laminatable members, and where at least one of said members is a filament containing reinforcing sheet; said apparatus comprising means for moving said laminatable members through said apparatus, means for impregnating at least the filament containing reinforcing sheet with a curable resin matrix, precuring means associated with said apparatus for precuring the matrix in said filament containing reinforcing sheet to a level immediately below the curing point of said matrix, means associated with said apparatus for bringing each of said laminatable members into facewise contact, final curing means to finally cure said laminatable members in said facewise contact into a rigid laminate structure, said final curing means including a pair of continuous belt-like members which engage the exteriorly presented faces of at least two of said laminatable members and retain the same in said facewise disposition during the final curing thereof, said continuous belt-like members being spaced apart from each other to define an elongated slot to receive the laminatable members, and means operatively associated with each of said belt-like members to shift each of said belt-like members toward and away from each other to variably adjust the size of said elongated slot in conformance with the thickness of the laminatable members.

14. The apparatus of claim 13 further characterized in that first of said laminatable members is a filament containing reinforcing sheet which is initially flexible, and a second of said laminatable members is a rigid panel so that the filament containing reinforcing sheet is laminated to a flat surface of said rigid panel.

15. The apparatus of claim 13 further characterized in that first of said laminatable members is a filament containing reinforcing sheet which is initially flexible, and a second of said laminatable members is a rigid panel so that the filament containing reinforcing sheet is laminated to a flat surface of said rigid panel, and a third laminatable member in the form of a filament containing reinforcing sheet which is initially flexible is impregnated and laminated to the opposed flat surface of said rigid panel.

16. The apparatus of claim 13 further characterized in that said two named laminatable members are both filament containing reinforcing sheets which are initially flexible.

17. The apparatus of claim 13 further characterized in that said precuring means comprises a dielectric precuring means operable with energy selected from the class consisting of radio frequency energy and microwave energy.

18. An apparatus for producing a reinforced sheet laminated structure comprised of at least two laminatable filament containing reinforcing sheet members, said apparatus comprising means for moving said laminatable members through said apparatus, means associated with said apparatus for impregnating both of the filament containing reinforcing sheet members with a curable resin matrix, means associated with said apparatus for bringing each of said sheet members into facewise contact, and curing means associated with said apparatus to completely cure said sheet members in said facewise contact into a rigid laminate structure, said last name means including a pair of continuous belt-like members which engage the exteriorly presented faces of at least two of said laminatable members and retain the same in said facewise disposition during the curing thereof.

19. The apparatus of claim 18 further characterized in that said curing means comprises a dielectric curing means operable with energy selected from the class consisting of radio frequency energy and microwave energy.

20. The apparatus of claim 18 further characterized in that said curing means comprises a dielectric curing means operable with energy selected from the class consisting of radio frequency energy within the frequency range of 13 to 100 megahertz and microwave energy within the frequency range of 1,500 to 25,000 megahertz.

21. The apparatus of claim 18 further characterized in that said apparatus comprises a dielectric precuring means operable with energy selected from the class consisting of radio frequency energy and microwave energy and that the apparatus comprises final curing means to finally cure said members.

* * * * *